July 15, 1952  R. K. LANMAN  2,603,000
BIFOCAL LENS GAUGE AND MARKER
Filed March 24, 1945
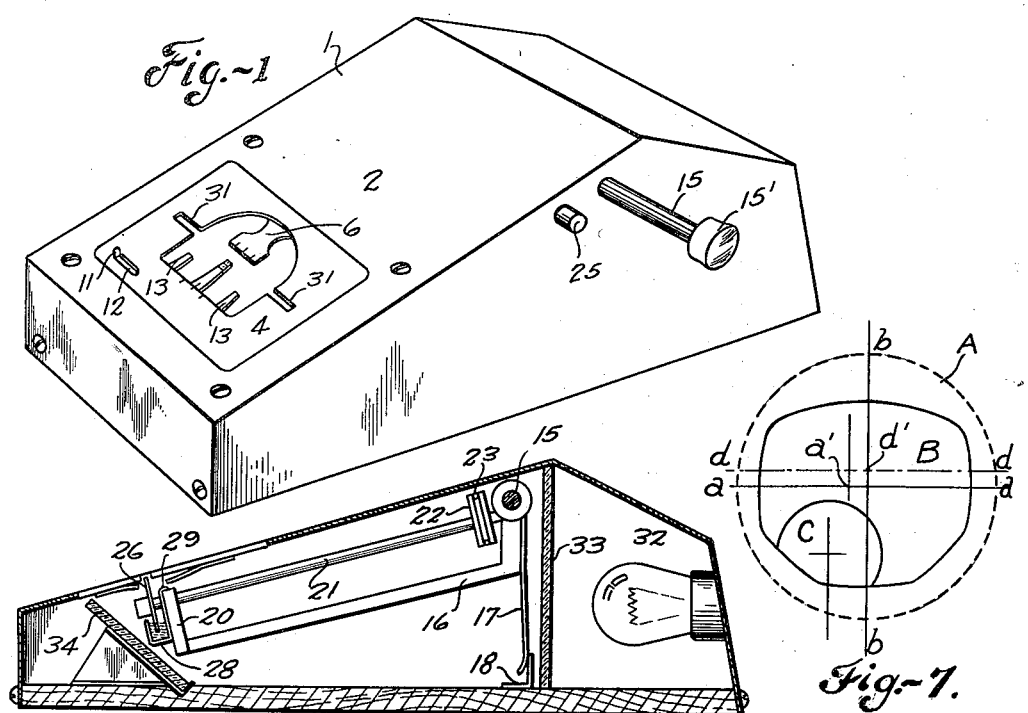
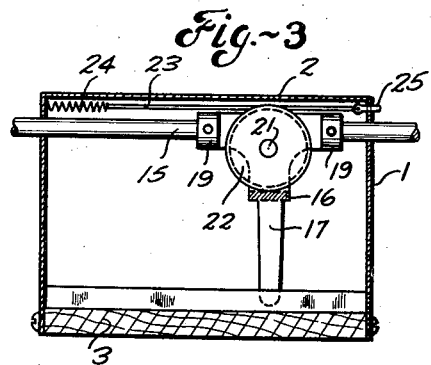
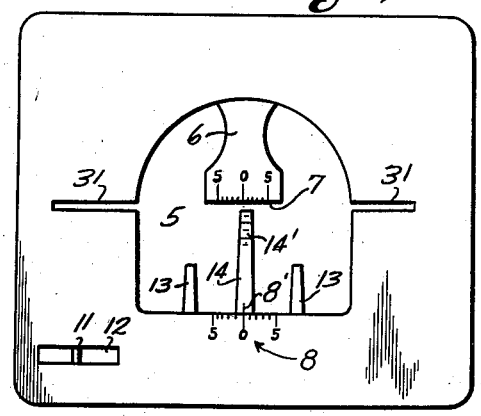
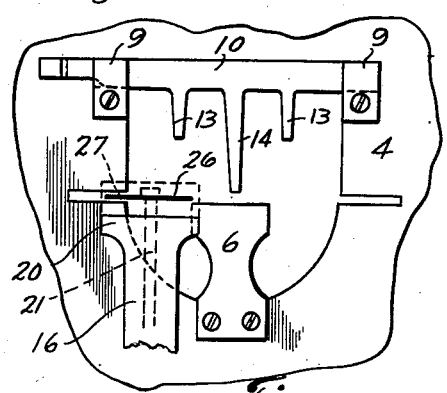
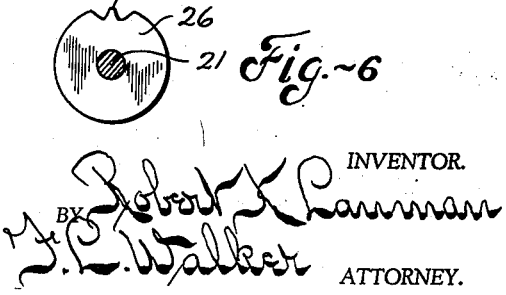
INVENTOR.
Robert K. Lanman
BY F. C. Walker
ATTORNEY.

Patented July 15, 1952

2,603,000

UNITED STATES PATENT OFFICE 2,603,000

BIFOCAL LENS GAUGE AND MARKER

Robert K. Lanman, Dayton, Ohio

Application March 24, 1945, Serial No. 584,709

13 Claims. (Cl. 33—21)

This invention pertains to marking apparatus for ophthalmic lenses which have been preground and polished and the optical center (and axis of a cylindrical correction) properly located thereon by a conventional axiometer. It relates more particularly to an apparatus for accurately locating and marking upon the lens a "cutting line" preparatory to "edging" or contouring the lens to its final shape, with the optical center of the distance vision field and bifocal segment decentered the required distances both vertically and horizontally, i. e., with the proper degree of "drop" and "inset" from the vertical and horizontal diameters of the finished lens, in accordance with the correction prescription. Such cutting guide is now marked by hand operation with aid of a protractor or chart and a pen or stylus, which hand method is slow and lacks the requisite accuracy.

A primary object of the invention is to provide a lens marking apparatus of simple construction and operation, which may not only be economically manufactured, but which will be efficient in use, uniform in operation, easily operated, having but few operating parts, and be unlikely to get out of repair.

A further and important object of the invention is to increase the speed and also the accuracy with which a "cutting line" or guide may be located and applied to a lens blank.

A further object of the invention is to produce a thin, clear line, preferably but not necessarily an ink line, having a medial center dot, or mark upon one side of the lens without interfering with the previously applied axiometer marking upon the opposite side of the lens.

A further object of the invention is to provide a lens marking apparatus of small size, compact form and enclosed construction of pleasing appearance, which will present the lens in convenient and comfortable position for gaging and marking.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is illustrated the preferred but obviously not necessarily the only form of embodiment of the invention, Fig. 1 is a perspective view of an assembled lens marking apparatus embodying the present invention.

Fig. 2 is a longitudinal vertical sectional view thereof.

Fig. 3 is a transverse vertical sectional view.

Fig. 4 is a top plan view of the lens locating and gaging area.

Fig. 5 is a reverse view of the disclosure of Fig. 4 observed from the under side thereof.

Fig. 6 is a detail view of the marking disc.

Fig. 7 is a detail view, somewhat diagrammatic, of a lens blank, showing the measurements and marking performed thereon by use of the instant apparatus.

Like parts are indicated by similar characters of reference throughout the several views.

Referring to the diagrammatic view Fig. 7, there is therein shown a prepared lens blank A, relative to which is outlined the contour of a completed or "edged" lens B having therein a bifocal segment C. The lens B is to be cut from the previously ground and polished lens blank A, on which has been marked in a preliminary axiometer operation the optical center $a'$ of the distance vision field and the horizontal diameter $a$—$a$ of the lens blank A. The problem solved by the instant apparatus is that of locating the outline of the finished lens B in such relation to the original blank A that the optical center $a'$ of the distance field will be offset or "decentered" a prescribed distance to the right or left of the vertical diameter $b$—$b$ of the finished lens B, and that the bifocal segment will be the prescribed distance or "drop" below the center $d'$ of the finished lens, and that the optical center of the bifocal segment shall be "inset" or displaced a prescribed distance to the right or left of the vertical diameter $b$—$b$ of the finished lens B.

When the lens blank A is properly located in the present apparatus, and the extent of "decenter," "drop" and "inset" have been properly determined by measurement upon appropriate scales, a dot and dash "cutting line," preferably an ink line, $d$—$d$ is drawn on the blank A for use as a guide line in locating the blank in the cutting or edging machine to produce the finished lens B. The dashes of the cutting line $d$—$d$ serve to vertically locate the lens area B while the medial dot $d'$ or a cross mark locates the lens B laterally relative to the cutting or edging machine.

The present gaging and marking apparatus is contained in a cabinet or housing 1, having an inclined top 2 and base or bottom 3. Adjacent to the forward and lower end of the inclined top 2 is a lens blank pallet 4, preferably, but not necessarily, removable from the cabinet. The pallet 4 has therein an opening 5, into the field of which a fixed tongue 6 extends from the top margin of the opening sufficiently below the plane thereof to accommodate the convexity of a lens blank A placed on the pallet 4. The fixed tongue 6 extends approximately to the horizontal diameter of the opening 5. The terminal margin of the tongue 6 is graduated in opposite directions from its center to afford a scale 7 by which the degree of decentration of the optical center $a'$ of the distance field of the lens is measured. At the bottom of the opening 5 of the lens pallet is a second fixed scale 8 also graduated in opposite directions from its center, by which the measured "inset" of the bifocal segment is determined.

Mounted in guide bearings 9 on the under side of the lens pallet 4 is a reciprocatory slide 10 manually adjustable to and fro by a tongue 11 projecting therefrom through a slot 12 in the pallet 4. The slide 10 carries a pair of relatively spaced locating fingers 13 underlying the opening 5 of the pallet, relative to which the bifocal segment C of the lens blank A is centered when positioned upon the pallet. Mounted upon the reciprocatory slide 10 intermediate the locating fingers 13 is a graduated tongue 14 movable to and fro with the slide 10, relative to which the lens blank is manually shifted vertically. While maintaining the bifocal segment centered relative to the fingers 13 the lens is shifted vertically to determine by the scale 14' on the tongue 14 the prescribed "drop" of the segment below the center $d'$ of the finished lens. By shifting the slide 10 to and fro in unison with the lens blank, the "inset" of the bifocal segment is determined by measurement upon the base scale 8, with which a gage mark 8' at the bottom of the tongue 14 cooperates to indicate such dimension.

The differential between the "decenter" distance of the optical center $a'$ of the distance viewing field and the "inset" of the bifocal segment of a spherical lens blank is accommodated by a slight partial rotation of the blank upon the pallet 4. Such differential of a cylindrical lens is provided in the initial grinding of the lens blank in accordance with the prescription. In either event, it is necessary to dimensionally locate such features upon the blank A as herein described.

When the lens blank A has thus been properly positioned upon the pallet 4, in accordance with the correction prescription, the cutting line $d$—$d'$—$d$ is inscribed thereon as hereafter described.

Extending across the cabinet 1 adjacent the highest portion thereof, is a manually reciprocatory shaft 15 projecting laterally beyond the cabinet, and having a handle knob 15' by which it may be moved to and fro. Mounted upon the shaft 15 is an arm 16 for to and fro horizontal motion in unison with the reciprocation of the shaft 15, but capable of limited vertical oscillatory motion. The arm 16 is yieldingly supported in its elevated position by a dependent spring blade 17, the lower end of which has sliding abutment against a bar 18 extending transversely across the cabinet adjacent its bottom 3. The arm 16 is preferably journaled on the shaft 15 for such limited vertical oscillatory motion between spaced collars 19 secured thereon, by which the reciprocatory motion of the shaft 15 is transmitted to the arm. At its extremity the arm 16 carries an enlarged head 20. A revoluble shaft 21 extends in parallel relation with the arm 16 and is journaled in and extends beyond the head 20. The shaft 21 is journaled also in a suitable bearing adjacent the engagement of the arm upon the supporting shaft 15.

The rotary shaft 21 carries a grooved pulley 22 adjacent to its connection with the reciprocatory shaft 15. A tensioned cord or small cable 23 extends transversely of the cabinet in parallel spaced relation with the reciprocatory shaft 15. One end of the cable is connected by an interposed retractile spring 24 with one side wall of the cabinet, while the opposite end thereof is connected with an adjustable screw stud 25 in the opposite side wall of the cabinet. The intermediate portion of the tensioned cable 23 is disposed in one or more turns about the pulley wheel 22, and transmits thereto and to the shaft 21 upon which the pulley wheel 22 is mounted, rotary motion as the shaft 15 and arm 16 carried thereby are shifted to and fro across the cabinet.

Secured for unison rotation to the end of the rotary shaft 21 beyond the head 20 of the arm 16 is a marking disc 26, the periphery of which is notched to afford a marking projection 27, producing a dot intermediate elongated lines or dashes produced by rolling the marking disc 26 against the under side of a lens blank properly positioned upon the lens pallet 4. The lower segment of the disc 26 is submerged in an ink supply within an ink reservoir 28 suspended upon the head 20 of the arm 16. The ink reservoir 28 is provided with small hook fingers 29 which detachably engage in spaced holes in the top of the head 20 of the arm 16. The periphery of the marking disc 26 is pressed under tension of the spring blade 17 against the under side of the lens blank positioned upon the lens pallet 4, and may yield slightly under tension against the yielding resistance of the spring blade 17 to accommodate the convexity of the lens and maintain continuous marking contact therewith. The lens pallet 4 is slotted at 31 at each side of the opening 5 to receive the marking disc 26 as it approaches the opposite limits of its range of travel. The marking disc 26 is positioned upon the shaft 21 in such relation that the marking tongue 27 will impress upon the positioned lens the dot $d'$ of the cutting line in vertical alignment with the zero positions of the scales 7 and 8, coincident with the vertical axis of the finished lens B to be edged or contoured and relative to which the optical center $a'$ of the distance field has been "decentered."

The screw stud 25 to which the end of the cable is attached provides means for rotatively adjusting the shaft 21 and marking disc 26 carried thereby to bring the projecting tongue to a "zero" position, whereby the center mark $d'$ may be properly located to indicate the vertical diameter of the finished lens B to be cut from the blank. By tightening or loosening the stud 25, the cable 23 is caused to slightly rotate the shaft and marking disc in one direction or the other to synchronize the indicating mark $d'$ with the zero position of the scale 7.

The lens blank having been accurately positioned upon the pallet 4 with the optical center $a'$ decentered, the prescribed distance as measured upon the scale 7, and the "drop" of the bifocal segment having been determined a measured distance relative to the vertical scale 14', and the "inset" of the bifocal segment having been located by adjustment of the slide 10, then while the lens blank is being held in its adjusted position upon the pallet, the shaft 15 is reciprocated by grasping its knob 15' to roll the marking disc 26 across the lens and thereby impress thereon the "cutting line" $d$—$d'$—$d$, after which the marked lens is transferred to the edging or contouring machine on which the finished lens is outlined and cut in relation to such impressed "cutting line."

To better illuminate the lens while being located on the pallet, a lamp 32 is provided within the rear end of the cabinet, in front of which a translucent ground glass diaphragm 33 is disposed transversely of the cabinet and diffused light from the lamp is directed thereby upon an inclined mirror reflector 34. The transmitted light is reflected by the mirror through the lens blank being positioned upon the pallet to facilitate its proper location.

While the instant marking apparatus has been described as applicable to finished and polished lens blanks preparatory to cutting and edging operations, its use is not limited thereto. Without change it is also applicable to semi-finished lens blanks which have been ground and polished on one side only, to apply thereto guide lines or indicia to facilitate the subsequent grinding operations to be performed on the unfinished side thereof by locating the axis and optical center of the blank in relation to the pre-positioned bifocal segment. Wherefore, reference in the claims to cutting and edging operations shall be deemed to include surfacing operations preparatory to which the lens must be definitely positioned and marked.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A lens gaging and marking apparatus, including a lens blank pallet having an opening therein, illuminating means transmitting light through the opening and through a lens blank positioned upon the pallet, a stationary graduated scale supported within the opening for measuring the decentration of a previously located optical center of a distance viewing field of a lens blank relative to the position of the vertical axis of the completed lens to be cut therefrom, a reciprocatory slide carried by the pallet, locating means on the slide for determining the relative position of a bifocal segment of the lens blank relative to the slide, a graduated scale on the pallet with which the reciprocatory slide cooperates to indicate the inset of the bifocal segment relative to the vertical axis of the finished lens to be cut from the blank, and a graduated scale carried by the reciprocatory slide measuring the drop of the bifocal segment below the level of the optical center of the distance viewing field, and marking means impressing upon the positioned lens blank a cutting line perpendicular to the vertical axis of the finished lens to be cut from the blank.

2. A bifocal lens gaging and marking apparatus, including lens blank locating means for positioning the lens blank in accordance with prescribed decentration of the optical center of the distance viewing field of the blank and the drop and inset of the bifocal segment thereof and a rotary marking disc supported for motion in a fixed path transversely of said locating means and engageable with the under side of the lens blank for indicating thereon a guide line and center mark in corresponding relation to a finished lens to be cut from the lens blank, and means for actuating the marking disc.

3. A lens gaging and marking apparatus, including a lens pallet for receiving a lens blank, decentering and drop gages associated with the lens pallet for positioning the lens blank in accordance with the prescribed dimensional characteristics thereof, a marking member engaging the under side of the positioned lens means maintaining tensioned engagement of the marking member with the lens, and a carrier for the marking member movable transversely of the positioned lens by means of which the marking member is shifted across the positioned lens blank while in contact therewith to indicate thereon a guide line and center position of a finished lens to be cut from the blank, and a mounting for said carrier confining said carrier to linear motion in transverse relation to said lens pallet.

4. A bifocal lens gaging and marking apparatus, including a lens pallet upon which a lens blank may be adjustably positioned, a plurality of graduated scales associated with the lens pallet in relation to which the lens blank is located in accordance with the prescribed decentration of a previously marked optical center of the distance viewing field of the lens blank and the drop and inset of the bifocal segment of the lens blank, and a dot and dash line marker supported for motion in a fixed path transversely of the lens pallet for progressive movement across the under side of the positioned lens blank impressing thereon a horizontal guide line transversely of the lens blank in predetermined relation with a finished lens shape to be cut from the blank and impressing a medial mark thereon coincident with the intersection of said guide line and the vertical axis of the lens to be cut, to facilitate positioning of the lens blank in an edging or cutting machine for outline cutting of said lens shape.

5. A bifocal lens gaging and marking apparatus, including a graduated support upon which a lens blank is relatively adjustable into a prescribed position of dimensional characteristics as determined by said graduations, a marking device engageable with the under side of the positioned lens blank and movable relative thereto in a fixed path with respect to said support to impress on said lens blank a transverse guide line and indicate upon the blank the position of a vertical axis of a finished lens to be cut from the blank, a resilient mounting for the marking device by which it is yieldingly pressed against the under side of the positioned lens, and actuating means by which the marking device is caused to traverse the lens blank.

6. A bifocal lens blank gaging and marking apparatus wherein a lens blank having preindicated thereon the optical center of the distance viewing field thereof is positioned upon a lens support in an adjusted position corresponding to prescribed dimensional characteristics thereof, including a rotary marking device, a depressible spring influenced support therefor by which the marking device is pressed against the under side of the positioned lens, a revoluble shaft upon which the rotary marking device is mounted, a reciprocatory carrier therefor by which the marking device is actuated to and fro transversely of the positioned lens, and motion transmitting means actuated by the reciprocatory motion of the carrier to simultaneously rotate the rotary shaft and the marking device carried thereby, while the latter is in contact with the lens.

7. A bifocal lens gaging and marking apparatus, wherein a lens blank having preindicated thereon the optical center of the distant viewing field of the lens is located in measured relation with a lens support, a traveling revoluable marking device movable in a fixed path across the lens support and having progressive engagement transversely with the lens to mark thereon a guide line and the position of the vertical meridian of a finished lens to be cut therefrom, a yielding support upon which the traveling marker is carried to and fro transversely of the lens, a reciprocatory carrier therefor and motion transmitting means for rotating the marker by the reciprocatory motion of the carrier.

8. A bifocal lens gage and marker, including a cabinet having an opening in the top thereof, graduated scales associated with the cabinet opening in relation to which a lens blank having preindicated thereon the optical center of the viewing field thereof may be positioned in agreement with prescribed dimensional characteristics of the lens, a traveling marker engageable with the face of the lens to impress a guide mark thereon and indicate the position of a meridian of the lens perpendicular to the guide mark according to which the lens blank may be subsequently positioned in an edging and cutting machine to cut therefrom a finished lens, a transverse manually reciprocatory shaft mounted in said cabinet, an oscillatory arm carried by the shaft, a rotary shaft upon which the traveling marker is mounted carried by the oscillatory arm and movable therewith, a pulley on the revoluble shaft, a cable extending across the cabinet and including a turn thereof about the pulley relative to which the reciprocatory shaft, oscillatory arm and rotary shaft assembly is movable to and fro, by which movement relative to the cable the pulley and the rotary shaft receive rotary motion, and spring means urging the traveling marker into marking engagement with the lens blank.

9. A bifocal lens marking apparatus, a support for a lens blank upon which the lens may be positioned in prescribed measured relation, a rotary marking disc, a support therefor movable in a fixed path across said lens blank support for to and fro motion transversely of the field of the lens, actuating means therefor and motion transmitting means for rotating the marking disc while in contact with the lens in unison with the to and fro motion of its support to impress upon the lens a transverse guide line in accordance with which the lens blank may be subsequently positioned in an edging or cutting machine to cut therefrom a marginally shaped lens having prescribed dimensional characteristics.

10. In a bifocal lens marking apparatus, a rotary marking disc engageable with a face of a lens blank, a resiliently mounted supporting arm therefor yieldingly urging the marking disc against the face of a lens to be marked, a reciprocatory carrier for the resiliently mounted arm, and motion transmitting means for rotating the marking disc in unison with its travel across the face of the lens blank to impress thereon a guide mark relative to which the marked lens blank may be subsequently positioned in a lens edging or cutting machine for cutting therefrom a marginally shaped lens of prescribed dimensional characteristics.

11. In a bifocal lens marking apparatus, a lens blank support upon which a lens blank is variously adjustable into prescribed measured relation, a rotary marking member yieldingly pressed against a face of the lens blank, actuating means for progressively moving the rotary marking member across the lens face, and motion transmitting means for rotating the marking member in unison with its movement across the lens face, the construction and arrangement being such that the rotating marking disc will produce on the lens face a guide indication in predetermined relation with the outline of a lens to be subsequently cut from the lens blank.

12. In a bifocal lens gaging and marking apparatus, a cabinet having an opening in the top thereof relative to which a lens blank may be positioned in predetermined dimensional relation, a traveling marking device engageable with the under side of the positioned lens and movable thereacross to position thereon a guide line in accordance with which the lens blank may be subsequently positioned in a lens edging or cutting machine to cut therefrom a lens shape of prescribed dimensional characteristics, actuating means for the traveling marker, a reflecting surface beneath the lens position opening in the cabinet top, a distant illuminating device, and a diffusing diaphragm between the illuminating device and the reflecting surface, by which diffused light is reflected through a lens to be marked when positioned over said opening.

13. A bifocal lens gaging and marking apparatus, including lens blank positioning means wherein the lens blank may be positioned in accordance with prescription requisites of decentration, drop and inset, a traveling frame movable in a linear path, a marking device carried by said frame for movement transversely of said positioning means, and progressively engageable with the under side of the positioned lens blank to impress thereon a guide line relative to which the lens blank may be positioned in an edging or cutting machine in such relation as to produce a finished lens having the prescribed dimensional characteristics.

ROBERT K. LANMAN.

REFERENCES CITED

The following references are of record in the file of this patent:

UNITED STATES PATENTS

| Number | Name | Date |
|---|---|---|
| 286,382 | Brissard | Oct. 9, 1883 |
| 676,943 | Flora | June 25, 1901 |
| 1,096,772 | Uphaus | May 12, 1914 |
| 1,164,795 | Emerson | Dec. 21, 1915 |
| 1,459,369 | Hill | June 19, 1923 |
| 1,642,575 | Bugbee | Sept. 13, 1927 |
| 1,691,739 | Schur | Nov. 13, 1928 |
| 1,929,534 | Long | Oct. 10, 1933 |
| 2,146,599 | Smith | Feb. 7, 1939 |
| 2,178,516 | Brenner | Oct. 31, 1939 |
| 2,351,274 | McCarter | June 13, 1944 |

FOREIGN PATENTS

| Number | Country | Date |
|---|---|---|
| 330,216 | Germany | Dec. 9, 1920 |
| 369,538 | Germany | Feb. 20, 1923 |